US006322223B1

(12) United States Patent
Smith et al.

(10) Patent No.: US 6,322,223 B1
(45) Date of Patent: Nov. 27, 2001

(54) MOUNTING FOR OPTICAL COMPONENTS

(75) Inventors: Brian J E Smith, Yate; Roger M Badland, Wotton-Under-Edge, both of (GB)

(73) Assignee: Renishaw PLC, Gloucestershire (GB)

(*) Notice: Subject to any disclaimer, the term of this patent is extended or adjusted under 35 U.S.C. 154(b) by 0 days.

(21) Appl. No.: 09/708,627

(22) Filed: Nov. 9, 2000

(30) Foreign Application Priority Data

Mar. 11, 2000 (GB) .................................................. 0005814

(51) Int. Cl.[7] .................................................. G02B 7/182
(52) U.S. Cl. ............................ 359/871; 359/892; 248/476
(58) Field of Search .................................... 359/381, 871, 359/872, 892, 821; 248/476, 483; 356/301

(56) References Cited

U.S. PATENT DOCUMENTS 4,082,464 * 4/1978 Johnson, Jr. ........................... 356/188
5,442,438  8/1995 Batchelder et al. .................. 356/301
5,505,422 * 4/1996 Elterman .............................. 248/476
5,661,557  8/1997 Da Silva et al. ..................... 356/301

OTHER PUBLICATIONS

"Optics Guide 5" Melles Griot, 1990, p. 23–35.

* cited by examiner

Primary Examiner—Mark A. Robinson
(74) Attorney, Agent, or Firm—Oliff & Berridge, PLC

(57) ABSTRACT

A mounting for optical components, e.g. in spectroscopic apparatus, has a rotatable baseplate 10, on which a plurality of quadrant-shaped mounting plates 12 can be kinematically located. Each mounting plate 12 carries respective optical components, which can be brought into and out of an optical path by rotation of the base plate 10. One or more of the mounting plates 12 carries both a housing 14 for components such as filters 20,22 and also a beam steering mirror 24 on a bracket 16. A gap is provided between the housing 14 and the mirror 24, so that the light beam 30 in the optical path can pass unhindered through the gap when this mounting plate is in an inoperative position.

10 Claims, 4 Drawing Sheets

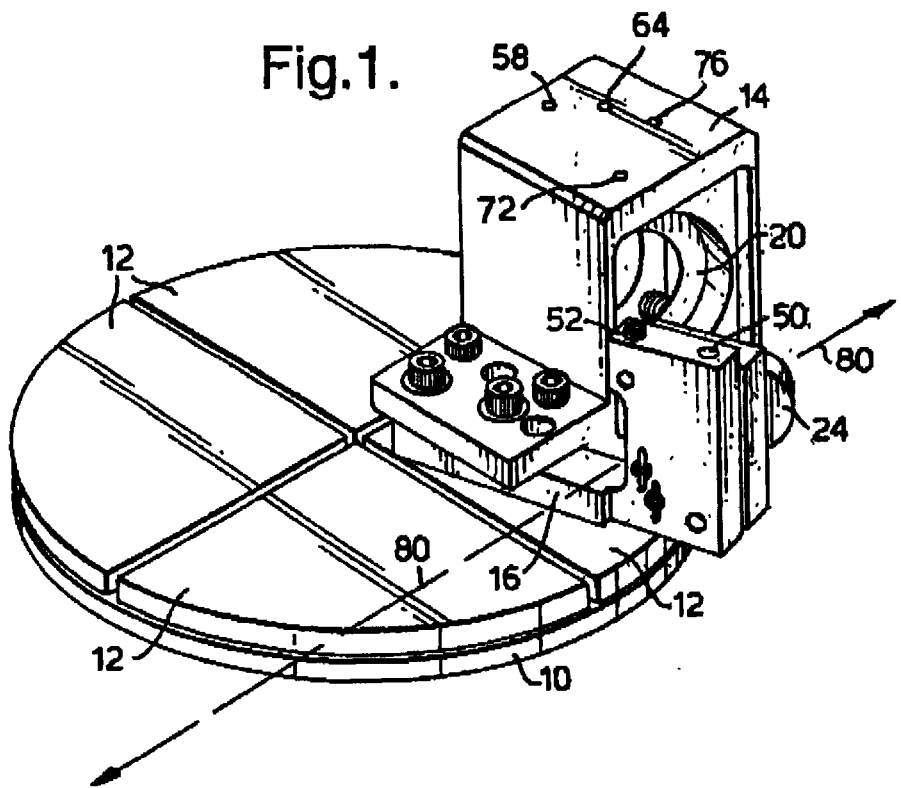
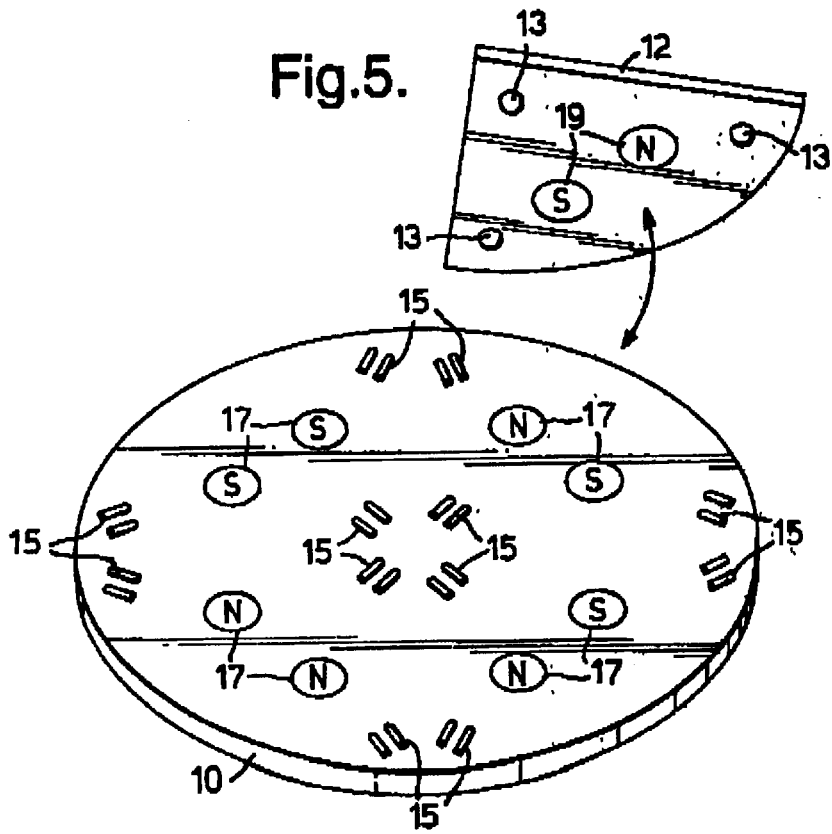

MOUNTING FOR OPTICAL COMPONENTS

FIELD OF THE INVENTION

This invention relates to mountings for optical components, for example for use in spectroscopic systems.

Description of Prior Art

A Raman spectroscopic system is described in U.S. Pat. No. 5,442,438 (Batchelder et al) which is incorporated herein by reference. Laser light is reflected by a dichroic filter arrangement, towards a microscope, in order to illuminate a sample which is to be examined under the microscope. Raman and Rayleigh back-scattered light is collected by the microscope objective and returned to the dichroic filter arrangement. This rejects the Rayleigh light at the laser wavelength, while passing the Raman scattered light at shifted wavelengths, towards a spectroscopic analyser and detector.

The dichroic filter arrangement may comprise a holographic filter, at a low angle of incidence such as 10°. In commercial embodiments of the apparatus described in U.S. Pat. No. 5,442,438, the scattered light passes through two such filters in series, to improve the rejection of the Rayleigh scattered light.

When using such apparatus, it is often desirable to use a different laser wavelength. When the laser wavelength is changed, it is necessary also to change (amongst other things) the holographic or other dichroic filters, so that they reflect and reject the new laser wavelength. It is necessary for the new filters to be properly aligned.

SUMMARY OF THE INVENTION

Preferred embodiments of the present invention seek to provide more convenient ways to exchange optical components, for example in the apparatus of U.S. Pat. No. 5,442,438.

In one aspect, the invention provides a mounting device for optical components, comprising:

a base, the base being rotatable about an axis relative to an optical path;

a plurality of mounts for optical components, located or locatable in respective mounting positions on the base, the mounts being movable by rotation of the base such that when optical components are mounted therein they are moved between operative and inoperative positions relative to the optical path, an optical component in one mount being brought to an inoperative position when an optical component in another mount is brought to an operative position;

at least one of said mounts being capable of holding at least first and second such optical components, said first and second optical components being located on opposite sides of the optical path when in an inoperative position, with a gap between them which permits passage of a light beam along the optical path.

BRIEF DESCRIPTION OF THE DRAWINGS

An optical mounting device according to the present invention will now be described by way of example, with FIG. 1 is a perspective view of parts of a mounting device;

FIG. 4d is a detail of filter holders seen in FIG. 4a; and

FIG. 5 is a perspective view of two mounting plates seen in FIGS. 1 and 2.

DESCRIPTION OF PREFERRED EMBODIMENTS

Figure 2:
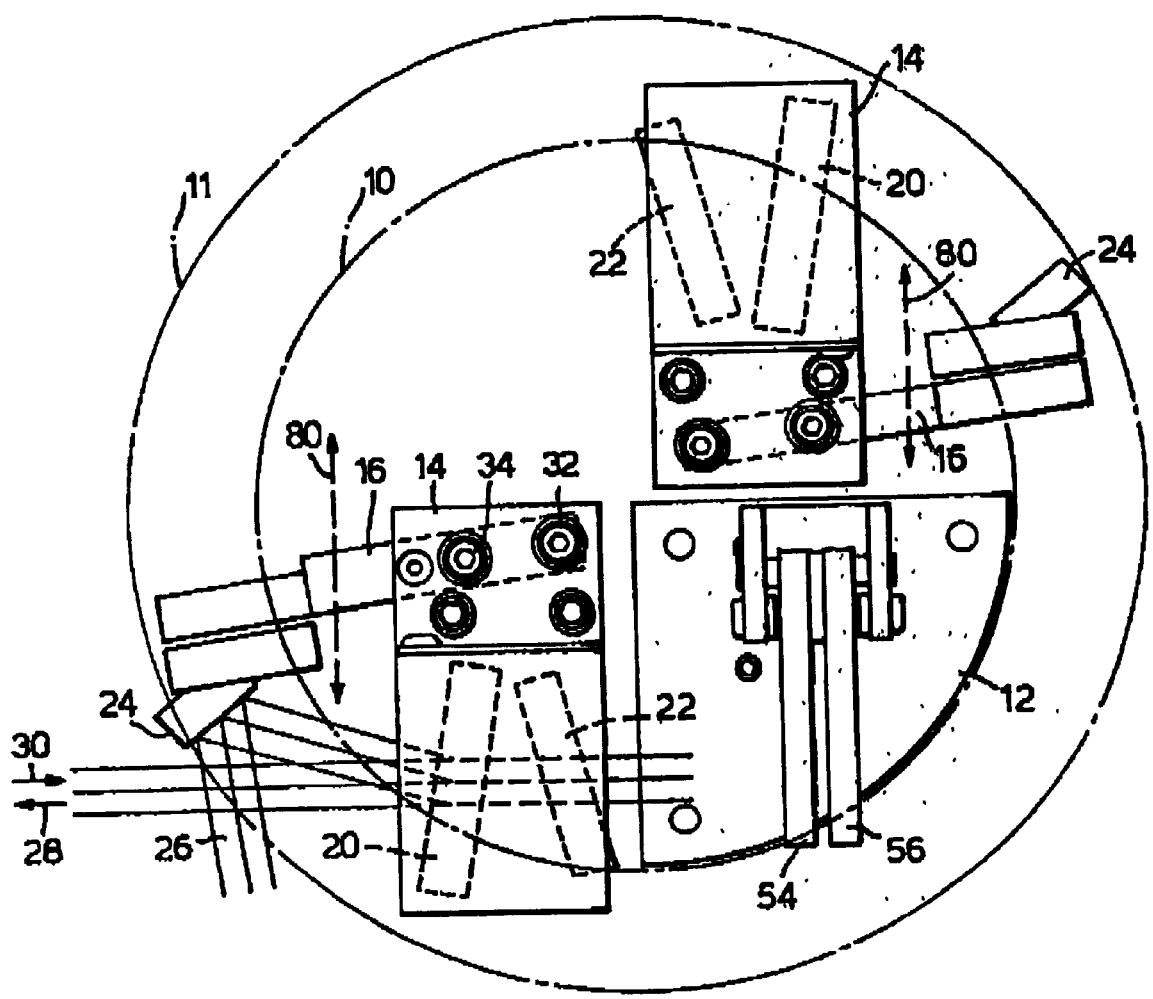
FIG. 2 is a plan view of the mounting device, showing different parts.

The mounting device shown in FIG. 1 of the accompanying drawings is intended for use in, for example, a spectroscopic apparatus such as shown in FIG. 1 of U.S. Pat. No. 5,442,438, to which the reader should refer. In particular, it is intended to fit at the position of the dichroic filter 18 shown in U.S. Pat. No. 5,442,438.

The device comprises a circular base plate 10, which in use is mounted on a motorised rotatable stage or turntable (marked 11 in FIG. 2) for pivoting about its axis. Up to four quadrant-shaped plates 12 are mounted kinematically on the plate 10, in a manner described in more detail below. Each quadrant-shaped plate 12 carries one or more optical components which are to be selectively inserted and removed from the beam path of the spectroscopic apparatus.

Referring also to FIG. 2, one or more of the quadrant-shaped plates 12 mounts a housing 14, containing two holographic notch or edge filters in respective holders 20,22. The housing 14 also carries a bracket 16 for holding a mirror 24. In use, an input laser beam 26 is reflected by the mirror 24 towards the holographic filter 20. This reflects it towards a microscope for illuminating a sample, as indicated by an arrow 28. The microscope collects back-scattered Raman and Rayleigh scattered light, which returns along the same path, as indicated by an arrow 30. This light then passes through the holographic filters 20,22, which reject the Rayleigh scattered light having the same wavelength as the laser, passing only the desired Raman scattered light and other light at wavelengths shifted from the laser wavelength.

The holographic filters in their holders 20,22 are adjustably mounted at low angles of incidence relative to the beam 28,30, e.g. 10°, for the reasons explained in U.S. Pat. No. 5,442,438.

The bracket 16 holding the mirror 24 is also adjustable. For coarse adjustment, it can pivot within the plane of FIG. 2, about a pivot point 32. The coarse adjustment may be fixed by tightening a screw in an elongate slot 34.

Figure 3A:
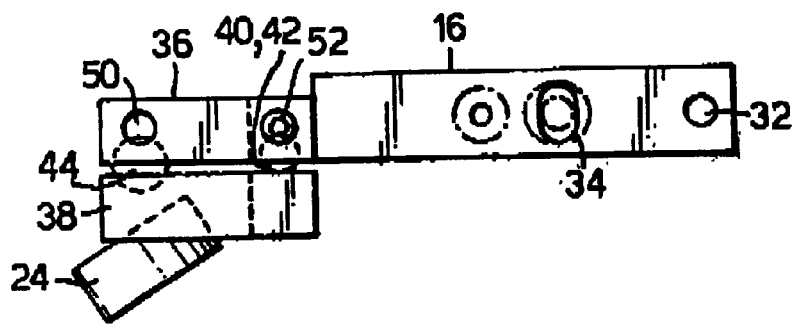
FIGS. 3a, 3b and 3c are plan, side and end views of a mirror mounting bracket.
Figure 3B:
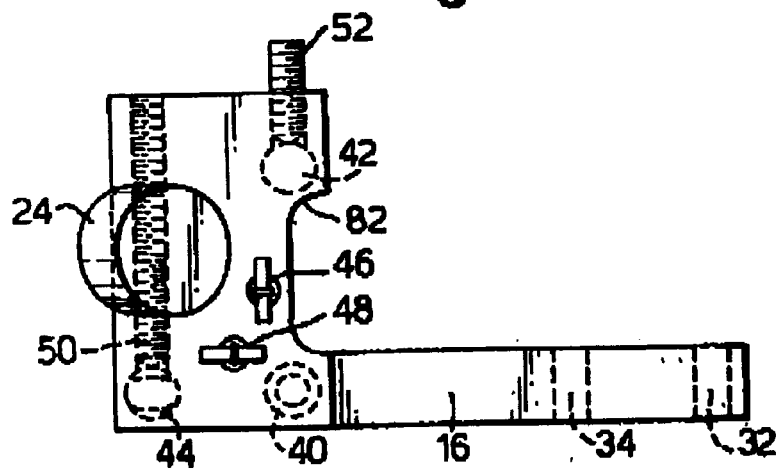
Figure 3C:
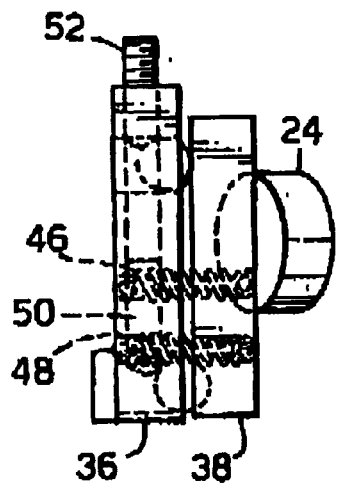

For fine adjustment, as shown in FIGS. 3a–3c, the bracket 16 is provided with an adjustable kinematic mount, acting between plates 36,38. The kinematic mount comprises three balls 40,42,44 trapped between the plates 36,38, which are urged together by springs 46,48. The ball 40 is trapped in conical recesses in the plates 36,38 and acts as a pivot point for the adjustments. The ball 44 is trapped in a groove in the plate 38. To adjust it, it is acted upon by an off-centre grub screw 50, which pushes the ball 44 to cause pivoting of the plate 38 about a line between the balls 40 and 42. The ball 42 acts on a flat surface of the plate 38. It is adjusted by means of an off-centre grub screw 52, which pushes the ball 42 to cause the plate 38 to pivot about an axis joining the balls 40,44.

Adjustment of the grub screws 50,52 therefore provides fine adjustment of the plate 38, and thus of the mirror 24. In particular, and in contrast to known kinematic mounts for optical components, it should be noted that the adjustments of the grub screws 50,52 take place from above the bracket 16. This is especially convenient when mounted in the spectroscopic apparatus, particularly since adjustments must be made without interrupting the various light beams.

The kinematic mount between the plates 36 and 38 may be modified in accordance with known kinematic principles. For example, each of the balls 40,42,44 may be retained in an appropriately-directed vee groove in the plate 38. Alternatively, a non-kinematic or quasi-kinematic mount may be used.

As seen in FIG. 2, several of the holographic filter housings 14 (with mirror-holding brackets 16) may be mounted on different ones of the quadrant-shaped plates 12. Two are shown in FIG. 2. Thus, by rotating the plate 10 through 180°, a different pair of the holographic filters 20,22 may be inserted in the paths of the beams 26,28,30. As also shown in FIG. 2, a third one of the plates 12 may mount such components as a polarising filter 54 and half waveplate 56, for use in conjunction with one of the holographic filter sets 20,22. This then takes the place of the component designated 44 in U.S. Pat. No. 5,442,438. The optical components mounted on two of the plates 12 are thus simultaneously located in their respective operative positions relative to the optical path.

The remaining quadrant in FIG. 2 may similarly be used for a polarising filter and half waveplate, for use with the other holographic filter pair. Or it may carry a conventional beamsplitter or a non-holographic dichroic filter, for injecting the laser light towards the sample, in place of the holographic filter 20. Alternatively, however, it may carry a third housing 14 for holographic filters with an accompanying mirror-holding bracket 16. Indeed, all four quadrants may be provided with holographic filter-containing housings 14 and mirror-holding brackets 16.

Thus, each of the housings 14 provided on the different plates 12 may contain holographic filters manufactured to reject and reflect a different laser wavelength. The use of the spectroscopic apparatus may thus swap between two, three or four different laser wavelengths. When he or she does so, the rotary stage 11 is simply rotated through 90°, 180° or 270° to bring the correct filter/mirror set into position. It will be appreciated that the filters and mirrors need only be adjusted once, and can then be swapped in and out of the beam path whenever required, without further adjustment.

FIGS. 4a–4d show in more detail how the holders 20,22 for the holographic filters are adjusted in the housing 14.

The filter holder 22 is pivoted about a pair of vertical pivot pins 58. It has a recess containing a cylindrical insert 60. A cone-ended grub screw 64 bears down off-axis on the insert 60. Tightening of this grub screw pushes the insert 60 sideways, causing the filter holder 22 to pivot about the pivot pins 58. The angle of incidence of the filter in the holder 22, relative to the beam path, can therefore be adjusted.

The filter holder 20 is provided with a more comprehensive adjustment capability, since not only must it be adjusted to the desired angle of incidence relative to the beam, but it must also co-operate with the mirror 24 and the incoming laser beam 26 so that the laser beam is correctly aligned along the path 28 towards the microscope and the sample. This is achieved as follows.

The filter holder 20 has two recessed cylindrical inserts 68,70 on opposing sides of its upper edge. Each of these co-operates with a respective cone-ended grub screw 72,76 which bears down off-axis against it. The bottom of the holder 20 pivots about a slightly loose fitting pivot pin 66.

Tightening the grub screw 76 against the insert 70 causes the holder 20 to pivot about an axis between the insert 68 and the pivot pin 66. This allows for adjustment of the angle of incidence of the filter in the holder to approximately the desired angle. Tightening the grub screw 72 against the insert 68 then causes the holder 20 to pivot about an axis between the insert 70 and the pivot pin 66. Since these two axes are not parallel with each other, repeated adjustments of the two screws 72,76 enable the alignment of the filter in the holder 20 to be set to the required angles in both horizontal and vertical planes.

The filter holders 20,22 are biased against the action of the grub screws 64,72,76 by two compression springs 77 and a tensions spring 78, which act between the holders. Stop pins 92 limit the permissible range of pivoting movement of the holder 20, and similar stop pins may be provided for the holder 22.

Of course, other adjustment devices may be provided for the holders 20,22. For example, the cylindrical inserts 60,68, 70 may be replaced by other slanting surfaces, against which grub screws can bear (e.g. ball-ended grub screws). Alternatively, either or both of the holders (especially the holder 20) may be provided with an adjustable kinematic mount, for example as provided between the plates 36,38 in FIG. 3.

As in FIG. 3, it is a feature of the adjustment arrangement seen in FIG. 4 that all three grub screws 64,72,76 are accessible from above. This ensures that the adjustments can be made conveniently, in situ in the spectroscopic apparatus, without risk of fouling the optical beam paths.

An important feature of the relative arrangement of the housing 14 and mirror bracket 16 is that it provides a gap between the mirror and the other optical components. This gap allows for clearance of an optical beam at the positions indicated by broken arrows 80 in FIGS. 1 and 2, when the mirror 24 and the optical components 20,22 in the housing 14 are in an inoperative position. It will be seen that the mirror 16 and the housing 14 are on opposite sides of the optical path. The gap between them allows the passage of the beam 30, in a case where three or four of the plates 12 are provided with respective filter housings 14 and mirror brackets 16. Thus, when any of the pairings of housings 14 and brackets 16 are in inoperative positions, out of use, it is ensured that they do not foul the beam 30 through the filter housing 14 which is in use. It will be seen from FIG. 3b that the plates 36,38 of the mirror bracket 16 have a cut-away portion 82, to accommodate the passage of the beam.

An advantage of this arrangement, with the beam 30 passing through the gap between the housing 14 and mirror 24, is that it enables the entire mounting device to be smaller than would otherwise be possible. It will there bit into a smaller envelope, in existing instruments such as described in U.S. Pat. No. 5,442,438.

FIG. 5 shows how the quadrant plates 12 are mounted to the circular plate 10. Only one of the quadrant plates 12 is shown in FIG. 5.

Each of the quadrant plates 12 has embedded in its under-surface three balls 13, spaced apart triangularly. When the plate 12 is mounted on the plate 10, each ball 13 nests between a corresponding pair of cylindrical elements 15 embedded in the plate 10. The balls 13 and cylindrical elements 15 are arranged to form a kinematic support, so that the plate 12 (and the optical components mounted thereon) can be removed and then replaced in precisely the same position. This ensures that the optical components do not need readjustment when replaced.

The plate 12 is urged towards the plate 10, bringing the balls 13 and cylindrical elements 15 into contact, by magnets 17 on the plate 10 and corresponding magnets 19 on the plate 12. As shown, two pairs of magnets are used for each plate 12, but it would be possible if desired to use only one pair of magnets, arranged to attract each other. Indeed, it would be possible to use only a single magnet on the plate 12, if the plate 10 is ferromagnetic (or has a ferromagnetic insert). Alternatively, it would be possible to use only one magnet in each quadrant of the plate 10, if the plate 12 is ferromagnetic or has a ferromagnetic insert. Of course, larger numbers of magnets are also possible, e.g. four on each plate.

However, with the pairs of magnets 17,19, as shown, each plate 12 can have a unique combination of north and south poles, so that it mates correctly only with one corresponding pair of magnets in one of the quadrants of the plate 10. It is then impossible to replace a given plate 12 in the wrong quadrant of the plate 10. Consequently, when optical components on a given plate 12 have been correctly aligned, it can be assured that it will always be replaced in the same quadrant, and therefore will remain correctly aligned when replaced.

Figure 4A:
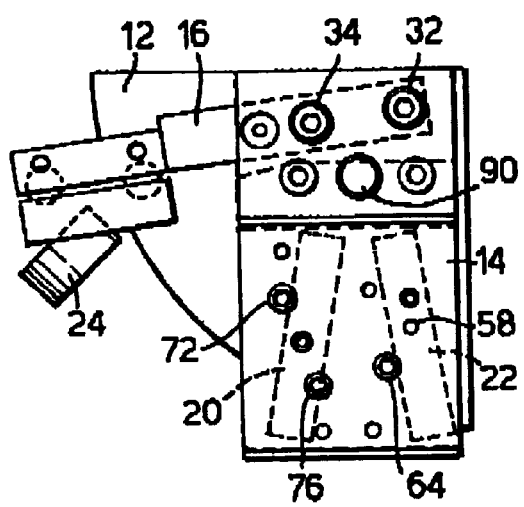
FIGS. 4a–4c are respectively a top plan view and views from each side of a filter mounting component seen in FIGS. 1 and 2.
Figure 4B:
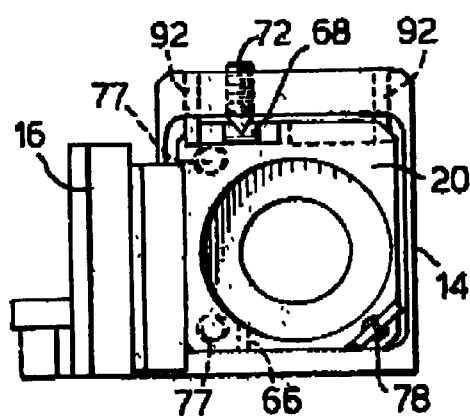
Figure 4C:
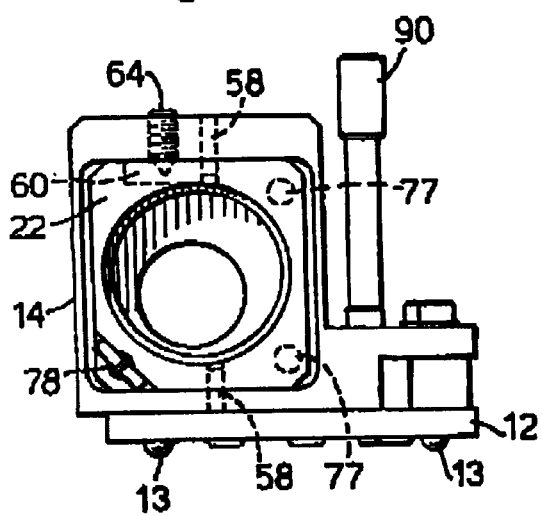
Figure 4D:
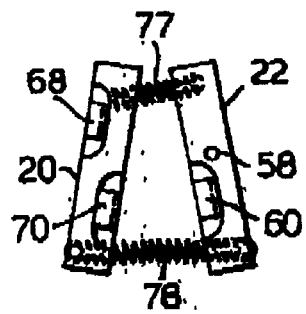

FIGS. 4a and 4c show an optional security screw 90, which prevents the plate 12 falling off the plate 10 and causing damage, e.g. if it is accidentally knocked. This screw has a knurled head so that it can easily be removed manually. When it is screwed in place, there is a small clearance between the screw 90 and the corresponding mounting holes in the housing 14 and plate 12, so that the screw does not interfere with the kinematic support provided by the balls 13 and cylindrical elements 15. A similar security screw may be provided for the other plates 12 shown in FIG. 2.

Of course, other forms of kinematic or quasi-kinematic mount can be used in place of the balls 13 and cylindrical elements 15. For example, vee grooves may be provided in the plate 10, in place of the cylindrical elements 15. Or the balls 13 may be provided on the plate 10, with the cylindrical elements 15 or vee grooves on the underside of the plate 12. Or one pair of cylindrical elements may be replaced by a conical or trihedral recess or a nest of three balls; and another may be replaced by a flat surface against which the corresponding ball 13 bears. This gives a kinematic support having three points of contact in one location, two in another and one in the third.

There may be more or less plates 12 than the four illustrated in the present embodiment. For example, there may be three such plates, each in the shape of a 120° sector. There may also be more than two magnets 17 in each quadrant of the plate 10, co-operating with a corresponding number of magnets 19 on the plate 12.

It will be noted that the mirror 24 in FIG. 2 is arranged on the opposite side of the beams 28,30 to the incoming beam 26, in contrast to the arrangement in U.S. Pat. No. 5,442,438. One advantage of this is that the alignment of the beams 26,28 is relatively insensitive to slight rotational mispositioning of the rotatable stage, since if the mirror 24 is in an incorrect rotational position, this is largely compensated by the incorrect rotational positioning of the filter 20.

What is claimed is:

1. A mounting device for optical components, comprising:
   a base, the base being rotatable about an axis relative to an optical path;
   a plurality of mounts for optical components, located in respective mounting positions on the base, the mounts being movable by rotation of the base such that when optical components are mounted therein they are moved between operative and inoperative positions relative to the optical path, an optical component in one mount being brought to an inoperative position when an optical component in another mount is brought to an operative position;
   at least one of said mounts being capable of holding at least first and second such optical components, said first and second optical components being located on opposite sides of the optical path when in an inoperative position, with a gap between them which permits passage of a light beam along the optical path.

2. A mounting device according to claim 1, wherein one of said first and second optical components is a mirror, and wherein said mirror directs light relative to the other of said first and second optical components when they are in the operative position.

3. A mounting device according to claim 1, wherein at least one of said mounts comprises an adjustable holder for an optical component.

4. A mounting device according to claim 3, wherein the adjustable holder comprises an adjustable kinematic support.

5. A mounting device according to claim 4, wherein the adjustable kinematic support has a plurality of adjustment screws which are accessible for adjustment from the same direction.

6. A mounting device according to claim 3, wherein the adjustable holder has a plurality of adjustment screws which are accessible for adjustment from the same direction.

7. A mounting device according to claim 1, wherein the mounts are locatable on kinematic supports in the mounting positions on the base.

8. A mounting device according to claim 7, wherein the mounts are urged into the kinematic supports in the mounting positions on the base by at least one magnet for each mount.

9. A mounting device according to claim 8, wherein the magnets for different mounts are differently configured, to prevent location of the mounts in the wrong mounting positions.

10. A mounting device according to claim 1, wherein the base is rotatable into a position in which the optical components in two of the mounts are simultaneously in their operative positions relative to the optical path.

* * * * *